United States Patent Office 3,242,986
Patented Mar. 29, 1966

3,242,986
METHOD FOR SEALING FORMATIONS
Wayne F. Hower, Duncan, Okla., assignor to Halliburton Company, Duncan, Okla., a corporation of Delaware
No Drawing. Filed Mar. 12, 1965, Ser. No. 439,429
8 Claims. (Cl. 166—31)

This application is a continuation-in-part of application for U.S. Letters Patent, Serial No. 158,098, filed December 8, 1961, now abandoned, which is a continuation-in-part of application for U.S. Letters Patent, Serial No. 580,994 filed April 27, 1956, now abandoned, and is entitled to all the benefits and privileges of said earlier filed applications.

This invention relates to methods useful for sealing earth formations and, more particularly, to methods for use in sealing off water bearing formations adjacent to oil or gas bearing formations.

For many years it has been the practice to inject slurries of Portland cement into earth formations adjacent to oil or gas bearing formations. The method is known in the trade as "squeeze cementing" and commonly involves the exertion of tremendous pressure on the slurry while confining it, insofar as possible, by the use of packers or the like to the particular zone or formation which is to be sealed off.

The conventional water-cement slurries have been applied with a great deal of success as a means of shutting off water, but their wide usage has definitely pointed to the fact that, in many instances, improvement was needed to increase the efficiency of squeeze cementing. Tests in the laboratory and applications in the field have shown that oil-cement slurries, and their modifications, are a step in that direction.

In sealing a water bearing formation with a non-aqueous or oil-cement slurry the operation is such that the cement solidifies and seals upon hydration resulting from contact with the water existing in the earth formation. The operation tends to be selective in that the cement does not set unless it comes in contact with water.

In United States patent application, Serial No. 397,484, U.S. Patent No. 2,800,963, entitled "Method and Composition for Sealing Earth Formations," which was co-pending herewith and was filed on December 10, 1953 by Hayden Roberts and the applicant herein, as joint inventors, it is proposed that a water bearing formation in an oil well or the like may be sealed off by injecting hereinto under pressure an intimately mixed slurry the essential ingredients of which are Portland cement, oil such as diesel oil or kerosene, and a surface active agent which is miscible with hydrocarbons.

It is a general object of the present invention to provide an improved method for sealing off water bearing formations in oil or gas wells or the like.

It is a particular object of the present invention to provide a new and improved method for sealing water-bearing formations in oil or gas wells and the like, utilizing a cementing composition which has relatively low fluid loss properties.

It is another important object of the present invention to provide a new and improved sealing water-bearing formations in oil or gas wells and the like, utilizing a cement slurry of the non-aqueous mineral oil type wherein the amount of cement dispersed in the mineral oil is substantially greater than has heretobefore been possible.

Still another object of the present invention is to provide a new and improved method of cementing oil and gas wells or the like wherein the cementing slurry has low fluid loss characteristics.

A further object of the present invention is to provide a new and improved method of cementing oil and gas wells wherein an improved slurry is obtained.

Yet a further object of the present invention is to provide an improved method of cementing wells utilizing a cement slurry of the non-aqueous or oil-cement type suited for use in squeeze cementing operations performed to seal off a water bearing formation adjacent to an oil or gas formation.

Still a further object of the present invention is to provide an improved method of cementing wells utilizing a cement slurry of the non-aqueous or oil-cement type which provides additional and special advantages without sacrificing the general advantages obtainable using non-aqueous or oil-cement slurries heretofore available.

In accordance with the invention, the foregoing and other objects and advantages are attained by providing a composition of matter in the form of an intimately mixed slurry the essential ingredients of which are Portland cement, calcium chloride, mineral oil, and a surface active agent which is miscible with hydrocarbons.

The oil selected for making the slurry should be as free from water as possible so as to keep the cement particles dry, although one advantage of the present invention resides in the fact that the detrimental effect of water in the oil is less than where prior art non-aqueous cement slurries are used, as will appear more fully hereinafter.

Some diesel fuels contain as much as 15 percent water. These should be avoided. Usually kerosene and diesel fuels contain less than 1 percent water and such oils are recommended. Crude oil can be used but may cause trouble unless care is exercised to see that it does not interfere with the action of the surface active agent. If crude oil is used, it should have an API gravity of 30 degrees or more, be untreated, and be as free from water as possible.

The selection of the surface active agent depends on the following end effects:

(1) It must cause the oil to accept more cement as a dispersion.

(2) It must keep the dispersed cement particles suspended in the oil for several hours.

(3) It must permit water to penetrate the slurry under little or no outside pressure.

The miscible surface active agent should be hydrocarbon soluble or hydrocarbon dispersible. The percentage of surface active agent based on the oil should be within the limits of 0.1% to 5% with the general use between 0.5% to 2.5%.

As to the type of surface active agent, it is thought that anionic compounds are not satisfactory by themselves. Best results have been with cationic and nonionic surface active agents and seem to fall in the following classes:

*Cationic.*—Compounds containing nitrogen such as substituted oxazolines, substituted glyoxalidines, tertiary amines, polyethoxy amines and quaternary ammonium compounds.

*Nonionic.*—Polyoxyethylene esters, polyoxyethylene thioethers, polyoxyethylene addition compounds, and alkyl phenoxy polyoxyethylene derivatives.

The addition of certain fatty acids and the like to the above can enhance the desirable properties of the surface active agent and should be included.

For example: A mixture of an alkyl phenoxy polyoxyethylene derivative and a mixture of fatty acids that contains oleic acid gives satisfactory results.

By using a surface active agent with the oil to make a cement slurry, it has been found that a slurry of great density can be made, but one which has good pumping characteristics and requires low squeeze pressure in injecting it into earth formations. It has also been found that the cement when finally set is hard and of low permeability.

A rather surprising feature of the composition is the relatively small amount of oil used. This is desirable because the less oil, the less liquid phase of slurry squeezed into the formation and the quicker the hydration of the cement.

Experimental mixes in the laboratory have led to the following recommended proportions:

| | | |
|---|---|---|
| Portland cement | grams | 400 |
| Calcium chloride | do | 4 |
| Diesel oil | cc | 140 |
| Surface active agent | cc | 2.1 |

The ingredients should be intimately mixed. In the laboratory the surface active agent was dissolved in the diesel oil while the oil was being violently agitated in a Waring Blendor. The calcium chloride and cement were mixed together in dry or powdered form to provide a quantity of comminuted solids. The solids were then added to the liquid oil containing the surface active agent, agitation being continued until an intimately mixed slurry was obtained.

Laboratory tests were conducted in an attempt to compare properties of slurries prepared in accordance with the invention with the properties of prior art non-aqueous or oil-cement slurries.

In one series of tests, the regular API code procedure for determining the fluid loss and filter cake properties of muds was followed in an attempt to determine these properties of cement slurries. The results are shown in Table I.

ingredients and calculating the percentages thereof, the total amount of calcium chloride represented by the percentage number appearing for each of the slurry samples in which, as aforesaid, the cement could not all be dispersed in the oil, is less than is represented by the same number where it appears for a sample in which all of the cement could be dispersed in the oil.

It will be noted that where no surface active agent was included, as in samples No. 1 and 2, air blew through the sample in a very short time even where, as in sample No. 2, 2% calcium chloride was included as an additive.

On the other hand, where both the surface active agent and some calcium chloride were included, as in samples No. 5 and 7 and 9 to 17, both inclusive, air did not blow through the sample during the 30 minute test period except in the case of sample No. 5, and then only during the latter portion of the test period. In this instance the sample included 1.0% water and not more than 0.5% calcium chloride.

As previously indicated, the use of a cement slurry prepared in accordance with the present invention provides particular advantages where the oil in the slurry contains some water. This is believed apparent from the test data in Table I.

It will be noted that where no water was present or included, as in samples No. 1 and 2 and 8–13, inclusive, the fluid loss during each test period, however short such period, was considerably higher than it was during each test period involved where some water and 1% or more calcium chloride were present or included as additives, as

*Table 1*

| No. | Cement, g. | Diesel Oil, cc. | Surface Active Agent, cc. | Water, percent | CaCl$_2$, percent | Test Period | Fluid Loss, cc. | Filter Cake Condition & Thickness |
|---|---|---|---|---|---|---|---|---|
| 1 | 229 | 140 | None | None | None | 20 sec | 64 | Soft, 1/8". |
| 2 | 209 | 140 | None | None | 2 | 16 sec | 57 | Very Soft, 1". |
| 3 | 282 | 140 | 2.1 | 0.5 | None | 3 min. 37 sec | 44 | Soft, 1 3/8". |
| 4 | 255 | 140 | 2.1 | 1.0 | None | 1 min. 59 sec | 46 | Soft, 1 1/4". |
| 5 | 247 | 140 | 2.1 | 1.0 | 0.5 | 20 min. 5 sec | 51 | Very Soft, 1". |
| 6 | 224 | 140 | 2.1 | 1.0 | 1.0 | 30 min | 8 | None. |
| 7 | 302 | 140 | 2.1 | 1.0 | 2.0 | 30 min | 16 | Do. |
| 8 | 400 | 140 | 2.1 | None | None | 24 min. 31 sec | 58 | Soft, 1 1/8". |
| 9 | 400 | 140 | 2.1 | None | 0.25 | 30 min | 30 | None. |
| 10 | 400 | 140 | 2.1 | None | 0.5 | 30 min | 49 | Very Soft, 1 1/4". |
| 11 | 400 | 140 | 2.1 | None | 1.0 | 30 min | 40 | Soft, 1 1/8". |
| 12 | 400 | 140 | 2.1 | None | 2.0 | 30 min | 29 | None. |
| 13 | 400 | 140 | 2.1 | None | 4.0 | 30 min | 24 | Do. |
| 14 | 400 | 140 | 2.1 | 0.5 | 0.5 | 30 min | 14 | Do. |
| 15 | 400 | 140 | 2.1 | 0.5 | 1.0 | 30 min | 12 | Do. |
| 16 | 400 | 140 | 2.1 | 0.5 | 2.0 | 30 min | 12 | Do. |
| 17 | 400 | 140 | 2.1 | 0.5 | 4.0 | 30 min | 7 | Soft, 1/8". |

In making the tests, each slurry sample of Table I was subjected to 100 p.s.i. air pressure under which it remained for a period of 30 minutes or for a shorter period where air blew through the slurry prior to the end of the standard test period. Recognizing the fact that the fluid loss properties of different brands of cement vary somewhat, each slurry sample was prepared using the same brand of cement (Ideal Portland, having a surface area of 1833 cubic centimeters per gram). Where water was added, the percentage was by volume based on the volume of the diesel oil. Where calcium chloride was added, the percentage was by weight based on the weight of the dry cement.

It will be noted that the absence of any surface active agent, as in samples No. 1 and 2, reduced the amount of cement that could be dispersed in the oil. Also, the presence of as much as 0.5% water in the prior art slurries, as in samples No. 3 and 4, reduced the amount of cement that could be dispersed in the oil. However, the presence of only 0.5% water in the slurries prepared in accordance with the invention, as in samples No. 14, 15, 16 and 17, did not reduce the amount of cement that could be dispersed in the oil, although such a reduction did occur where, as in samples No. 5, 6, and 7, as much as 1% water was present.

Due to the aforesaid procedure used in mixing the in samples No. 15–17, inclusive. It will be further noted that in each of such latter instances air did not blow through the sample during the 30 minute test period.

Also, even in one instance where some water and only 0.5% calcium chloride were present or included, i.e., in sample No. 14, air did not blow through the sample during the 30 minute test period and the fluid loss was quite low. In the other instance where only 0.5% calcium chloride was added, i.e., in sample No. 5, 1% water was present. As previously noted, the presence of this much water reduced the amount of cement which could be dispersed in the oil and so the total calcium chloride actually present in sample No. 5 was less than was present in sample No. 14.

It will be noted that the addition of more than 1% calcium chloride, as in samples No. 16 and 17, did not appear to reduce the fluid loss much, if any, more than did the addition of only 1% calcium chloride, as in sample No. 16. Only 0.5% calcium chloride provided a low fluid loss slurry where only 0.5% water was present, as in sample No. 14.

On the basis of the test results shown in Table I, it is believed that at least 0.5% calcium chloride will ordinarily be required to obtain slurries having low fluid loss properties. Also, it is believed that more than about 1% calcium chloride will ordinarily not be needed where 1% or less water is present. However, experience may show that more or less than these amounts will be required for best results in particular operations.

The primary advantage obtainable using the present invention resides in the slurry having improved fluid loss and filter cake properties than prior art slurries, as noted in Table I. It is believed by some operators that cement slurries with low fluid loss properties, resulting in a thin filter cake built up in the well, are necessary in order to successfully perform a "permanent" well completion job.

Another advantage which may result from using the present invention resides in the fact that, as hereinabove noted, a larger amount of water may be present in the oil without substantially reducing the amount of cement which can be dispersed therein.

From the data shown hereinabove, it is readily apparent that the method of the present invention provides a low fluid loss cementing composition, with the fluid loss of the cementing composition as determined by API code procedure being substantially less than the fluid loss of the same cementing composition without calcium chloride added thereto.

While recommended procedures and proportions with respect to the ingredients of the invention have been given herein in order to make the disclosure complete, the invention should be limited only by the scope of the appended claims:

What is claimed is:

1. A method of selectively sealing a water bearing earth formation adjacent hydrocarbon bearing formations in oil and gas wells or the like, including the step of, introducing into the earth formation a low fluid loss non-aqueous cementing composition consisting essentially of Portland cement, mineral oil containing very little water, particulated calcium chloride and a surface active agent, said mineral oil being in an amount sufficient to form a pumpable slurry, said calcium chloride being in an amount ranging from about 0.25% to about 4.0% by weight based on the weight of the cement, and said surface active agent being in amount sufficient to improve the dispersibility of the cement in the oil and selected from the group consisting of cationic and nonionic surface active agents which are miscible with hydrocarbons, whereby the fluid loss of said cementing composition as determined by API code procedure is substantially less than the fluid loss of the same cementing composition without the calcium chloride added thereto.

2. A method of selectively sealing a water bearing earth formation adjacent hydrocarbon bearing formations in oil and gas wells or the like, including the step of, introducing into the earth formation a low fluid loss non-aqueous cementing composition consisting essentially of Portland cement, mineral oil, particulated calcium chloride and a surface active agent, said mineral oil containing less than about 1% water by volume based on the volume of the oil and being in an amount sufficient to form a pumpable slurry, said calcium chloride being in an amount ranging from about 0.5% and 2.0% by weight based on the weight of the cement, and said surface active agent being in an amount sufficient to improve the dispersibility of the cement in the oil and selected from the group consisting of cationic and nonionic surface active agents which are miscible with hydrocarbons, whereby the fluid loss of said cementing composition as determined by API code procedure is substantially less than the fluid loss of the same cementing composition without the calcium chloride added thereto.

3. A method of selectively sealing a water bearing earth formation adjacent hydrocarbon bearing formations in oil and gas wells or the like, including the step of, introducing into the earth formation a low fluid loss non-aqueous cementing composition consisting essentially of Portland cement, mineral oil containing very little water, particulated calcium chloride, and a surface active agent, said Portland cement being in an amount ranging from about 224 grams to about 400 grams per about 140 cubic centimeters of the oil, said mineral oil being in an amount sufficient to form a pumpable slurry, said calcium chloride being in an amount ranging from about 0.25% to about 4.0% by weight based on the weight of the cement, and said surface active agent being in an amount sufficient to improve the dispersibility of the cement in the oil and selected from the group consisting of cationic and nonionic surface active agents which are miscible with hydrocarbons, whereby the fluid loss of said cementing composition as determined by API code procedure is substantially less than the fluid loss of the same cementing composition without the calcium chloride added thereto.

4. A method of selectively sealing a water bearing earth formation adjacent hydrocarbon bearing formations in oil and gas wells or the like, including the step of, introducing into the earth formation a low fluid loss non-aqueous cementing composition consisting essentially of Portland cement, mineral oil, particulated calcium chloride, and a surface active agent, said Portland cement being in an amount ranging from about 224 grams to about 400 grams per 140 cubic centimeters of the oil, said mineral oil containing less than about 1% water by volume based on the volume of the oil and being in an amount sufficient to form a pumpable slurry, said calcium chloride being in an amount ranging from about 0.5% to about 2.0% by weight based on the weight of the cement, and said surface active agent being in an amount sufficient to improve the dispersibility of the cement in the oil and selected from the group consisting of cationic and nonionic surface active agents which are miscible with hydrocarbons, whereby the fluid loss of said cementing composition as determined by API code procedure is substantially less than the fluid loss of the same cementing composition without the calcium chloride added thereto.

5. A method of selectively sealing a water bearing earth formation adjacent a hydrocarbon bearing formation in an oil and gas well or the like, comprising the steps of intimately mixing dry Portland cement in a proportion of from about 224 grams to about 400 grams per 140 cubic centimeters of mineral oil with dry particulated calcium chloride in an amount ranging from about 0.25% to about 4.0% by weight of said cement, intimately mixing a surface active agent and a mineral oil, said surface active agent being in an amount sufficient to improve the dispersibility of the cement in the oil and selected from the group consisting of cationic and nonionic surface active agents which are miscible with hydrocarbons, said mineral oil being in an amount sufficient to form a pumpable slurry, intimately mixing the Portland cement-calcium chloride compositions with the mineral oil-surfactant compositions thereby forming a low fluid loss non-aqueous cementing composition, and introducing the low fluid loss non-aqueous cementing compositions into the water bearing earth formation, whereby the fluid loss of said cementing composition as determined by API code procedure is substantially less than the fluid loss of the same cementing composition without the calcium chloride added thereto.

6. A method of selectively sealing a water bearing earth formation adjacent a hydrocarbon bearing formation in an oil and gas well or the like, comprising the steps of intimately mixing dry Portland cement in a proportion of from about 224 grams to about 400 grams per 140 cubic centimeters of mineral oil with dry particulated calcium chloride in an amount ranging from about 0.5% to about 2.0% by weight of said cement, intimately mixing a surface active agent and a mineral oil, said surface active agent being in an amount sufficient to improve the dispersibility of the cement in the oil and selected from the group consisting of cationic and nonionic surface active agents which are miscible with hydrocarbons, said mineral oil containing less than about 1% water by volume based on the volume of the oil and being in an amount sufficient to form a pumpable slurry, intimately mixing the Portland cement-calcium chloride compositions with the mineral oil-surfactant compositions thereby forming a low fluid loss non-aqueous cementing composition, and introducing the low fluid loss non-aqueous cementing composition into the water-bearing earth formation, whereby the fluid loss of said cementing composition as determined by API code procedure is substantially less than the fluid loss of the same cementing composition without the calcium chloride added thereto.

7. A method of selectively sealing a water bearing earth formation adjacent a hydrocarbon bearing formation in an oil and gas well or the like, comprising the steps of intimately mixing dry Portland cement in a proportion of from about 224 grams to about 400 grams per 140 cubic centimeters of mineral oil with dry particulated calcium chloride in an amount ranging from 0.25% to about 4.0% by weight of said cement, intimately mixing a surface active agent and a mineral oil, said surface active agent being in a proportion of about 2 cubic centimeters to about 140 cubic centimeters of mineral oil and selected from the group consisting of cationic and nonionic surface active agents which are miscible with hydrocarbons, said mineral oil being in an amount sufficient to form a pumpable slurry, intimately mixing the Portland cement-calcium chloride compositions with the mineral oil-surfactant compositions thereby forming a low fluid loss non-aqueous cementing composition, and introducing the low fluid loss non-aqueous cementing composition into the water bearing earth formation, whereby the fluid loss of said cementing composition as determined by API code procedure is substantially less than the fluid loss of the same cementing composition without the calcium chloride added thereto.

8. A method of selectively sealing a water bearing earth formation adjacent a hydrocarbon bearing formation in an oil and gas well or the like, comprising the steps of intimately mixing dry Portland cement in a proportion of from about 224 grams to about 400 grams per 140 cubic centimeters of mineral oil with dry particulated calcium chloride in an amount ranging from about 0.5% to about 2.0% by weight of said cement, intimately mixing a surface active agent and a mineral oil, said surface active agent being in a proportion of about 2 cubic centimeters to about 140 cubic centimeters of mineral oil and selected from the group consisting of cationic and nonionic surface active agents which are miscible with hydrocarbons, said mineral oil containing less than about 1% water by volume based on the volume of the oil and being in an amount sufficient to form a pumpable slurry, intimately mixing the Portland cement-calcium chloride compositions with the mineral oil-surfactant compositions thereby forming a low fluid loss non-aqueous cementing composition, and introducing the low fluid loss non-aqueous cementing composition into the water bearing earth formation, whereby the fluid loss of said cementing composition as determined by API code procedure is substantially less than the fluid loss of the same cementing composition without the calcium chloride added thereto.

References Cited by the Examiner

UNITED STATES PATENTS

| | | | |
|---|---|---|---|
| 1,772,999 | 8/1930 | Huber | 106—90 |
| 2,800,963 | 7/1957 | Roberts et al. | 106—90 |

CHARLES E. O'CONNELL, *Primary Examiner.*

T. A. ZALENSKI, *Assistant Examiner.*